(12) United States Patent
Jeong et al.

(10) Patent No.: US 11,899,213 B2
(45) Date of Patent: Feb. 13, 2024

(54) AUGMENTED REALITY DEVICE AND METHOD OF CONTROLLING THE SAME

(71) Applicant: SAMSUNG ELECTRONICS CO., LTD., Suwon-si (KR)

(72) Inventors: Jaeyun Jeong, Suwon-si (KR); Seokyeol Kim, Suwon-si (KR); Gipyo Kim, Suwon-si (KR); Songhyeon Kim, Suwon-si (KR); Seunghak Shin, Suwon-si (KR); Haekyung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 17/438,246

(22) PCT Filed: Sep. 6, 2021

(86) PCT No.: PCT/KR2021/012052
§ 371 (c)(1),
(2) Date: Sep. 10, 2021

(87) PCT Pub. No.: WO2022/055204
PCT Pub. Date: Mar. 17, 2022

(65) Prior Publication Data
US 2023/0204957 A1    Jun. 29, 2023

(30) Foreign Application Priority Data
Sep. 10, 2020   (KR) .................. 10-2020-0116389

(51) Int. Cl.
*G09G 5/00*      (2006.01)
*G02B 27/01*     (2006.01)
(Continued)

(52) U.S. Cl.
CPC ............ *G02B 27/0172* (2013.01); *G06T 7/50* (2017.01); *G06T 7/70* (2017.01); *H04N 23/60* (2023.01);
(Continued)

(58) Field of Classification Search
CPC ........ G02B 27/0172; G02B 2027/0138; G06T 7/50; G06T 7/70; G06T 2207/30244; H04N 23/60
(Continued)

(56) References Cited

U.S. PATENT DOCUMENTS 8,208,719 B2   6/2012  Gordon et al.
9,928,420 B2   3/2018  Kirk et al.
(Continued)

FOREIGN PATENT DOCUMENTS

KR    10-2015-0111999 A    10/2015
KR    10-2017-0075510 A    7/2017
KR    10-2018-0083314 A    7/2018

OTHER PUBLICATIONS

Konolige et al., "Technical description of Kinect calibration," Structured Light Pattern of Kinect, (https://wiki.ros.org/kinect_calibration/technical) (7 total pages), last edited Dec. 27, 2012.
(Continued)

*Primary Examiner* — Thuy N Pardo
(74) *Attorney, Agent, or Firm* — Sughrue Mion, PLLC

(57) ABSTRACT

An augmented reality device includes an illuminator, a camera, a memory, and a processor, wherein the processor is configured to execute one or more instructions stored in the memory to turn on a light source of the illuminator to obtain a first image from the camera, turn off the light source to obtain a second image from the camera, estimate depth information, based on the first image, and estimate posture information, based on the second image.

18 Claims, 13 Drawing Sheets

(51) Int. Cl.
  *G06T 7/50* (2017.01)
  *G06T 7/70* (2017.01)
  *H04N 23/60* (2023.01)
(52) U.S. Cl.
  CPC ............... *G02B 2027/0138* (2013.01); *G06T 2207/30244* (2013.01)
(58) Field of Classification Search
  USPC .............................................. 345/8, 10, 102
  See application file for complete search history.

(56) References Cited

U.S. PATENT DOCUMENTS

| | | | |
|---|---|---|---|
| 2007/0146539 A1 | 6/2007 | Kawahara et al. | |
| 2014/0139639 A1 | 5/2014 | Wagner et al. | |
| 2015/0355527 A1 | 12/2015 | Takahashi et al. | |
| 2018/0359424 A1 | 12/2018 | Shibusawa et al. | |
| 2019/0187490 A1* | 6/2019 | Dominguez | G02B 27/0176 |
| 2019/0318181 A1* | 10/2019 | Katz | G06F 3/012 |
| 2020/0027271 A1* | 1/2020 | Guay | G06T 19/006 |
| 2020/0094406 A1* | 3/2020 | Kusano | G06T 7/74 |
| 2020/0167955 A1* | 5/2020 | Bao | G06T 7/248 |
| 2020/0175754 A1* | 6/2020 | Abe | G06T 7/74 |
| 2020/0197818 A1* | 6/2020 | Ma | A63F 13/424 |
| 2020/0351537 A1* | 11/2020 | Browy | G06T 19/003 |
| 2021/0081754 A1* | 3/2021 | Frolova | G06N 3/04 |
| 2021/0099654 A1* | 4/2021 | Chang | G06T 5/50 |
| 2021/0287274 A1* | 9/2021 | Nguyen | G06N 3/04 |
| 2022/0026743 A1* | 1/2022 | Dominguez | G02B 27/0176 |

OTHER PUBLICATIONS

"MagikEye's Invertible Light Technology", (https://www.magikeye.com/) (7 total pages) copyright 2019.

Martin Haker et al., "Self-Organizing Maps for Pose Estimation with a Time-of-Flight Camera", Jan. 2009, (13 total pages), (https://www.researchgate.net/figure/Sample-image-taken-with-a-MESA-SR4000-TOF-camera-Theleftmost-image-shows-the-amplitude_fig1_221115042).

Communication dated Jan. 3, 2022 issued by the International Searching Authority in counterpart Application No. PCT/KR2021/012052 (PCT/ISA/220, PCT/ISA/210, and PCT/ISA/237).

* cited by examiner

AUGMENTED REALITY DEVICE AND METHOD OF CONTROLLING THE SAME

TECHNICAL FIELD

Provided are an augmented reality device and a control method thereof.

BACKGROUND ART

Augmented reality is a technique for projecting a virtual image onto a real world physical environment or in combination with a real world object to show an image. An augmented reality device, when it is worn by a user as a head mounted device or a glasses, allows a real scene and virtual images to be viewed together through a see-through display in front of the user's eyes.

Recently, spatial augmented reality technology in which three-dimensional (3D)-based interaction factors are added to technology such as augmented reality are being researched. The core of the spatial augmented reality technology is 3D space recognition. With spatial augmented reality technology, 3D reality elements may be given 3D position information in space and may interact with a virtual object.

DESCRIPTION OF EMBODIMENTS

Technical Problem

Provided are an augmented reality device for estimating depth information and posture information, based on images obtained as a light source of an illuminator flickers, and a control method thereof.

Technical Solution to Problem

According to an aspect of the disclosure, there is provided an augmented reality device including: a light source; a camera; a memory storing one or more instructions; and a processor configured to execute the one or more instructions to: turn on the light source and obtain a first image from the camera, turn off the light source and obtain a second image from the camera, estimate depth information based on the first image, and estimate posture information based on the second image.

According to another aspect of the disclosure, there is provided a control method of an augmented reality device, the control method including: obtaining a first image from a camera by turning on a light source; obtaining a second image from the camera by turning off the light source; estimating depth information based on the first image; and estimating posture information based on the second image.

According to another aspect of the disclosure, there is provided a non-transitory computer-readable recording medium storing a program executable by a computer, the non-transitory computer-readable recording medium including: instructions to obtain a first image from a camera by turning on a light source; instructions to obtain a second image from the camera by turning off the light source; instructions to estimate depth information, based on the first image; and instructions to estimate posture information, based on the second image.

MODE OF DISCLOSURE

Figure 1:
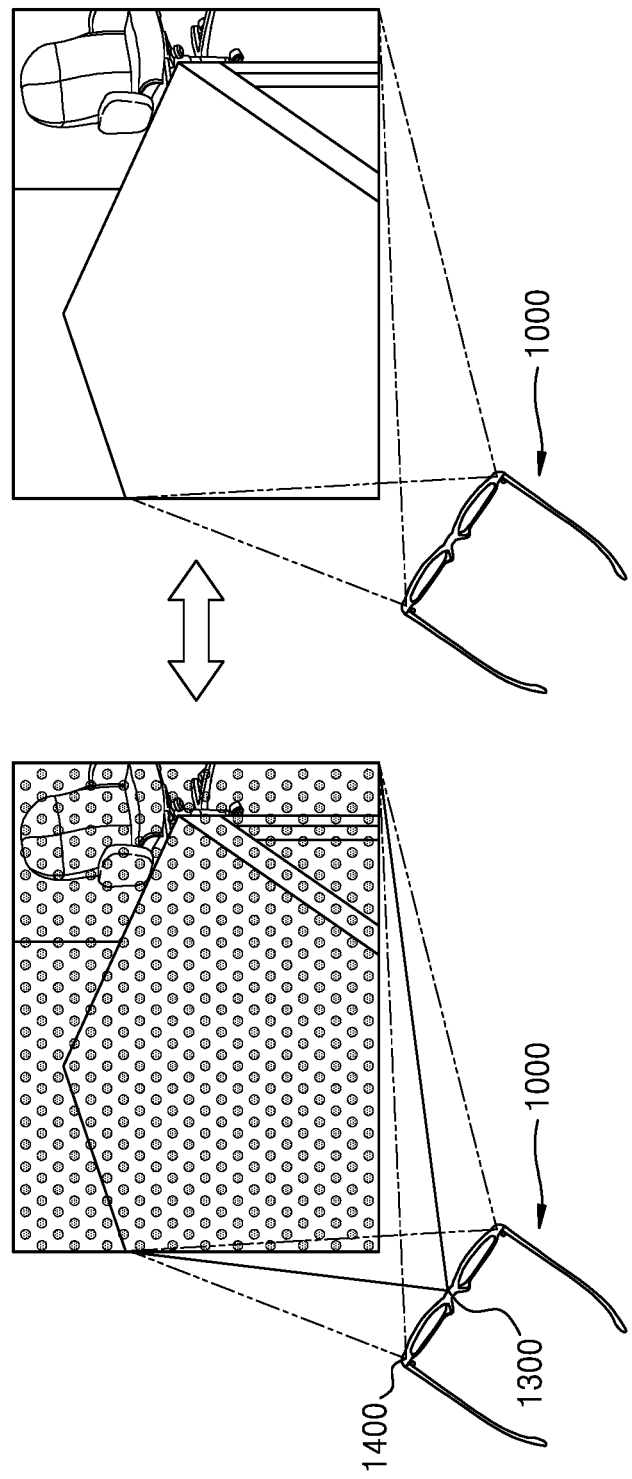
FIG. 1 is a diagram illustrating an operation of an augmented reality device when a light source of an illuminator flickers, according to example embodiments of the disclosure.

Throughout the disclosure, the expression "at least one of a, b or c" indicates "a", "b", "c", "a and b", "a and c", "b and c", "all of a, b, and c", or variations thereof.

Hereinafter, embodiments of the disclosure will be described in detail with reference to the accompanying drawings so that the embodiments of the disclosure may be easily implemented by those of ordinary skill in the art. The disclosure may be embodied in many different forms and is not limited to the example embodiments of the disclosure set forth herein.

It will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

Terms, including ordinal numbers such as "first" and "second", may be used herein to describe various components but the components should not be limited by the terms. The terms are only used to distinguish one component from another.

Embodiments of the disclosure are related to an augmented reality device and a control method thereof and a detailed description of parts that are well-known to those of ordinary skill in the art will be omitted here.

In the disclosure, "augmented reality (AR)" should be understood as showing virtual images in a real world physical environment or showing a real world object and virtual images together.

An "augmented reality device" refers to a device capable of expressing "augmented reality" and generally include augmented reality glasses designed to be worn on a user's head or face, a head mounted display apparatus designed to be worn on a user's head, an augmented reality helmet, etc.

A "real scene" refers to a scene of a real world that a user views through an augmented reality device and may include real world objects. A "virtual image" refers to an image created by an optical engine and may include both a static image and a dynamic image. A virtual image may be observed together with a real scene and may be an image representing information about a real world object in the real scene, information about an operation of an augmented reality device, a control menu, or the like.

Thus, a general augmented reality device includes an optical engine to generate a virtual image composed of light generated by a light source, and a waveguide formed of a transparent material to guide the virtual image generated by the optical engine to a user's eyes and allow a real world scene to be viewed together with the virtual image. As described above, because a scene of a real world should be viewed together with a virtual image through the augmented reality device, an optical element is needed to change a path of light having straightforwardness so that light generated by the optical element may be guided to a user's eyes through the waveguide. In this case, the path of light may be changed by reflection using a mirror or the like or may be changed by diffraction using a diffraction element such as a diffractive optical element (DOE) or a holographic optical element (HOE), but example embodiments are not limited thereto.

FIG. 1 is a diagram illustrating an operation of an augmented reality device 1000 when a light source of an illuminator 1300 flickers according to example embodiments of the disclosure.

The augmented reality device 1000 may obtain depth information of a space by using a camera 1400 to recognize a three-dimensional (3D) space. A passive sensor or an active sensor may be used to obtain depth information of the space. The passive sensor may be a stereo camera, a mono camera, an infrared sensor, a pan/tilt camera or the like, which operates without emitting light or a pulse to a subject or may be a device that senses a phenomenon such as heat, vibration, light, and radiation generated by a subject and obtains information regarding the phenomenon as an input. The active sensor may be a device that includes a source that emits light, illumination, pulse, or the like, towards a subject, and receives information reflected from the subject. Unlike the passive sensor, the active sensor may include a light source and thus may actively emit the light to a subject and measure backscattering reflected thereto from the subject. For example, the active sensor may be a time-of-flight (ToF) sensor that emits laser or infrared rays towards a subject and uses a phase difference or time difference of returning light. Moreover, the active sensor may be a structured light sensor that emits light having a certain pattern and calculates a distance according to the size or shape of an image formed on a subject. Also, the active sensor may be an invertible light sensor, a laser sensor, a microwave sensor, or the like.

According to a method of obtaining depth information by using an passive sensor, depth information may be estimated through feature point matching, based on data about a space obtained by the passive sensor. However, in the case of a space with a high ratio of a single color region, the number of feature points is insufficient for feature point matching and thus it may be difficult to estimate depth information through feature point matching. On the other hand, according to a method of obtaining depth information by using an active sensor, when the active sensor that actively emits light towards a subject is used, depth information may be estimated even with respect to an area with an insufficient number of characteristic points. For example, the active sensor may estimate depth information by emitting uniform high-frequency modulated infrared rays towards a subject and detecting a time difference or phase difference of reflected and returning light. In another example, the active sensor may estimate depth information by projecting light having a certain pattern towards a subject and matching feature points augmented according to a pattern formed by a light source or measuring a shape or size of the pattern.

However, when the active sensor is used in a situation in which a relationship between frames is considered to obtain posture information, light emitted from a light source of the active sensor is likely to interrupt accurate matching between frames. This is because the feature points augmented according to the pattern formed by the light source of the active sensor may cause inaccurate feature point matching between frames.

Therefore, in order for the augmented reality device 1000 to obtain accurate depth information and accurate posture information, both a sensor for obtaining depth information and a sensor for obtaining posture information are needed. However, when power consumption, volume, size, etc. of the augmented reality device 1000 are taken into consideration, mounting various types of sensors in the augmented reality device 1000 is not desirable in terms of the miniaturization, weight, and manufacturing costs of the augmented reality device 1000.

Thus, a method of estimating depth information and posture information by the camera 1400 of the augmented reality device 1000 that operates as an active sensor or a passive sensor when the light source of the illuminator 1300 flickers will be described below.

Although FIG. 1 illustrates that the camera 1400 of the augmented reality device 1000 is a stereo camera and the augmented reality device 1000 is augmented reality glasses, example embodiments of the disclosure are not limited to the example illustrated in FIG. 1. As shown in FIG. 1, the camera 1400 of the augmented reality device 1000 may be located at a position in which a frame supporting lens parts and temples for placing the augmented reality device 1000 on a user's face are in contact with each other, and the illuminator 1300 may be embedded in a bridge frame connecting a left lens part and a right lens part. However, the disclosure is not limited to the arrangement illustrated in FIG. 1, and as such, according to another example embodiment, the camera 1400 and the illuminator 1300 may be provided at another location of the augmented reality device 1000.

Referring to FIG. 1, the light source of the illuminator 1300 of the augmented reality device 1000 flickers. Light emitted from the light source of the illuminator 1300 may be projected into a space corresponding to a certain area of an entire space. The augmented reality device 1000 may obtain a first image and a second image by using the camera 1400 as the light source of the illuminator 1300 flickers. The augmented reality device 1000 may obtain the first image from the camera 1400 by turning on the light source of the illuminator 1300 and obtain the second image from the camera 1400 by turning off the light source of the illuminator 1300. In this case, the first image may include an optical pattern projected to a subject by the light source of the illuminator 1300 and the second image may not include the optical pattern. Thus, the augmented reality device 1000 may estimate depth information, based on the first image in which feature points are augmented, and estimate posture information, based on the second image. The augmented reality device 1000 according to an example embodiment of the disclosure will be described in more detail with reference to the drawings below.

Figure 2:
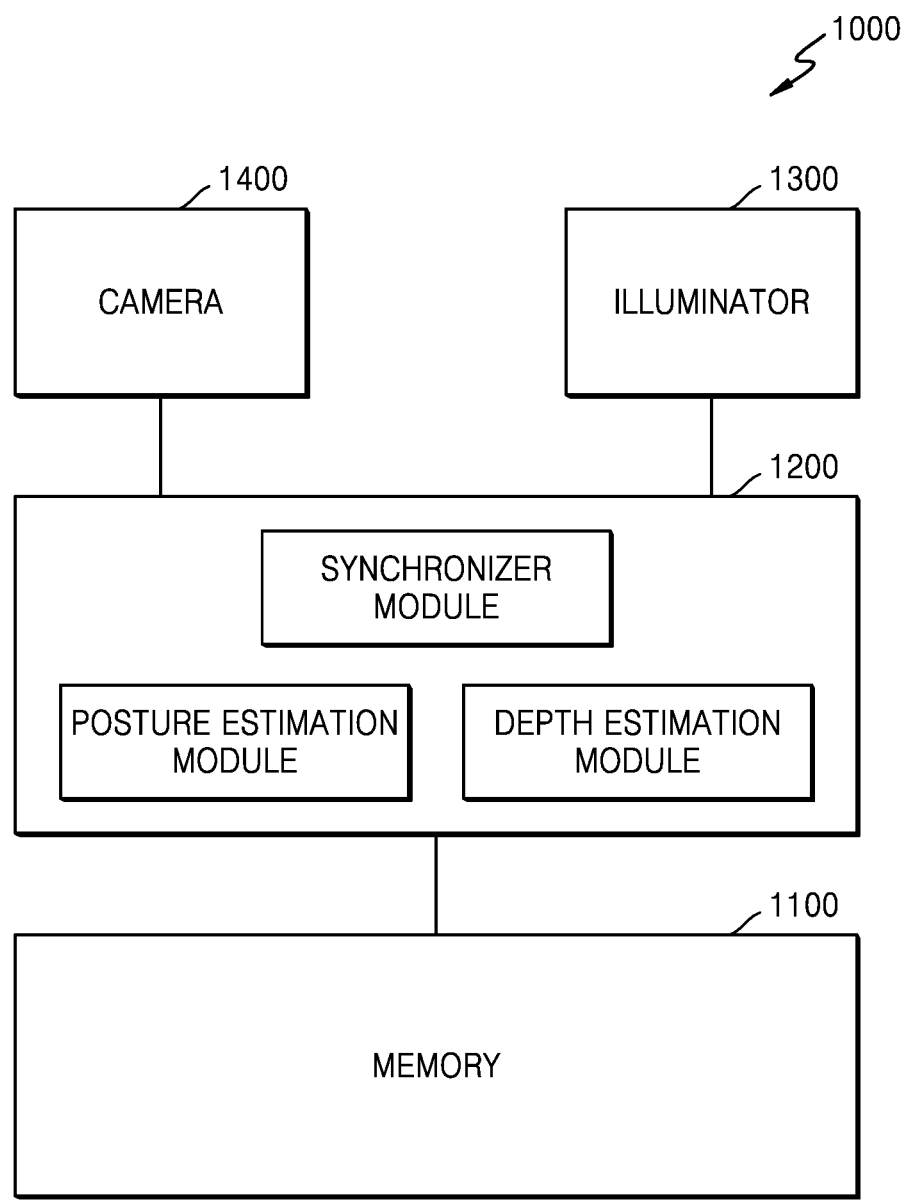
FIG. 2 is a diagram for explaining a configuration and operation of an augmented reality device according to an example embodiment of the disclosure.

FIG. 2 is a diagram for explaining a configuration and operation of an augmented reality device 1000 according to an example embodiment of the disclosure.

Referring to FIG. 2, the augmented reality device 1000 may include a memory 1100, a processor 1200, an illuminator 1300, and a camera 1400. It will be understood by those of ordinary skill in the art that general elements other than the elements illustrated in FIG. 2 may be further provided.

The memory 1100 may store instructions executable by the processor 1200. The memory 1100 may store a program including one or more instructions. For instance, the program may be a set of instructions or codes executable by the processor 1200. The memory 1100 may include, for example, at least one type of hardware device of a random access memory (RAM), a static random access memory (SRAM), a read-only memory (ROM), a flash memory, an electrically erasable programmable read-only memory (EEPROM), a programmable read-only memory (PROM), a magnetic memory, a magnetic disk, or an optical disk.

The memory 1100 may store at least one software module including instructions. When each of the at least one software module is executed by the processor 1200, the augmented reality device 1000 may performs a certain operation or function. For example, as shown in FIG. 2, a synchronizer module, a depth estimation module, and a posture estimation module may be executed by the processor 1200. However, the disclosure is not limited thereto and other software modules may be further provided.

The processor 1200 may execute instructions stored in the memory 1100 or a programmed software module to control an operation or a functions performed by the augmented reality device 1000. The processor 1200 may include hardware components to perform an arithmetic operation, a logic operation, input/output operations, and signal processing.

The processor 1200 may be configured as, but is not limited thereto, for example, at least one hardware component of a central processing unit, a microprocessor, a graphics processing unit, an Application Specific Integrated Circuit (ASIC), a Digital Signal Processor (DSP), a Digital Signal Processing Device (DSPD), a Programmable Logic Device (PLD), or a Field Programmable Gate Array (FPGA).

The illuminator 1300 may include a light source, and emit a uniform high-frequency modulated infrared ray to a subject or project light having a certain pattern to the subject. A light-emitting diode (LED), a laser diode, or a vertical cavity surface emitting laser (VCSEL) may be used as the light source. The illuminator 1300 may further include a collimating lens or a diffractive optical element to precisely control a field of view (FOV) and an optical path.

The camera 1400 may include an image sensor operable as both an active sensor and a passive sensor. That is, an active sensor for estimation of depth information and a posture information for estimation of posture information may be unified as one camera 1400. Accordingly, not only the size and volume of the augmented reality device 1000 but also the weight thereof may be reduced. For instance, compared to an augmented reality device which includes an active sensor and a separate RGB camera provided with the passive sensor, the camera 1400 of the augmented reality device 1000 includes an image sensor operable as both an active sensor and a passive sensor, thereby minimizing the size and weight of the augmented reality device 1000.

The camera 1400 may further include a lens module including lenses, an auto focus (AF) actuator, and an image signal processor. The lens module may have a structure in which a plurality of lenses are arranged in a lens barrel and allow light incident from the outside to pass through the lenses. The AF actuator may move the lenses to an optimal focus position to obtain a clear image. The image signal processor may convert an electrical signal obtained through conversion by an image sensor into an image signal.

However, according to an example embodiment, the camera 1400 may not include an infrared cutoff filter to operate as the active sensor. When an infrared wavelength band of the light source of the illuminator 1300 is considered, an infrared cutoff filter may be omitted in the camera 1400 to detect infrared components.

Due to the above configuration, the processor 1200 may execute at least one instruction stored in the memory 1100 to turn on the light source of the illuminator 1300 so as to obtain the first image from the camera 1400, turn off the light source so as to obtain the second image from the camera 1400, estimate depth information, based on the first image, and estimate posture information, based on the second image. The processor 1200 may load and execute the synchronizer module, the posture estimation module, and the depth estimation module stored in the memory 1100 to obtain the depth information and the posture information, based on the first image and the second image obtained by controlling the illuminator 1300 and the camera 1400.

The processor 1200 may execute at least one instruction stored in the memory 1100 to use the camera 1400 as the active sensor or the passive sensor as the light source of the illuminator 1300 flickers. The processor 1200 may alternately obtain the first image and the second image from the camera 1400 according to flickering of the light source of the illuminator 1300.

The processor 1200 may execute at least one instruction stored in the memory 1100 to adjust lengths of a turned-on period and a turned-off period of the light source of the illuminator 1300, an exposure time of the camera 1400, a frame rate of the first image, a frame rate of the second image, etc. For example, the processor 1200 may obtain the first image and the second image by equalizing the lengths of the turned-on period and the turned-off period of the light source of the illuminator 1300 and equalizing exposure times of the camera 1400 in the turned-on period and the turned-off period. As another example, the processor 1200 may obtain the first image and the second image by equalizing the lengths of the turned-on period and the turned-off period of the light source of the illuminator 1300 and setting exposure times of the camera 1400 in the turned-on period and the turned-off period to be different. As another example, the processor 1200 may obtain the first image and the second image by setting lengths of the turned-on period and the turned-off period of the light source of the illuminator 1300 to be different and setting a frame rate of the first image and a frame rate of the second image to be different. As another example, the processor 1200 may obtain the first image and the second image by setting the lengths of the turned-on period and the turned-off period of the light source of the illuminator 1300 to be different and equalizing the frame rate of the first image and the frame rate of the second image. In this case, in the turned-off period, an idle mode may be set before or after a shooting mode in which the camera 1400 obtains the second image.

The augmented reality device 1000 according to an example embodiment of the disclosure may employ various types of cameras 1400 and a light source to estimate depth information and posture information. For example, the camera 1400 of the augmented reality apparatus 1000 may be a mono camera, and the processor 1200 may estimate depth information with respect to the first image by a ToF method and estimate posture information by applying mono-simultaneous localization and mapping (SLAM) to the second image. SLAM is an algorithm for configuring or updating a map of an unknown environment and estimating a location or posture thereof on the map. The mono-SLAM is a type of visual-SLAM for estimating a location or posture thereof according to an image obtained by sensing surroundings using the camera 1400. As another example, the camera 1400 of the augmented reality device 1000 may include a first stereo camera and a second stereo camera, and the processor 1200 may estimate depth information with respect to at least one of a plurality of first images by the ToF method and estimate posture information by applying a stereo-SLAM to a plurality of second images. The stereo-SLAM is a type of visual-SLAM for estimating a location or posture thereof according to a plurality of images obtained by sensing surroundings using the camera 1400. As another example, the illuminator 1300 of the augmented reality device 1000 includes a light source for projecting light with a certain pattern to a subject, the camera 1400 may include a first stereo camera and a second stereo camera, and the processor 1200 may estimate depth information with respect to a plurality of first images by a stereo vision method and estimate posture information by applying the stereo-SLAM to a plurality of second images.

FIGS. 3 to 6 are diagrams illustrating examples of a method of obtaining a first image and a second image when a light source of an illuminator 130 of an augmented reality device 1000 flickers according to the example embodiment of the disclosure.

The augmented reality device 1000 may process, in a time-division manner, a first process of obtaining a first image in a turned-on period of the light source of the illuminator 1300 and a second process of obtaining a second image in a turned-off period of the light source of the illuminator 1300 to be alternately arranged in a temporal sense. The augmented reality device 1000 may temporally separate the first process and the second process to process different processes in parallel at different times. As an operation processing speed is increasing with the advancement of computing technology, processing in the time-division manner may produce the same effect as when different processes are processed at the same time.

Referring to FIGS. 3 to 6, the augmented reality device 1000 may obtain a first image and a second image by adjusting lengths of the turned-on period and the turned-off period of the light source of the illuminator 1300 of the augmented reality device 1000, an exposure time of the camera 1400, a frame rate of the first image, a frame rate of the second image, etc.

Figure 3:
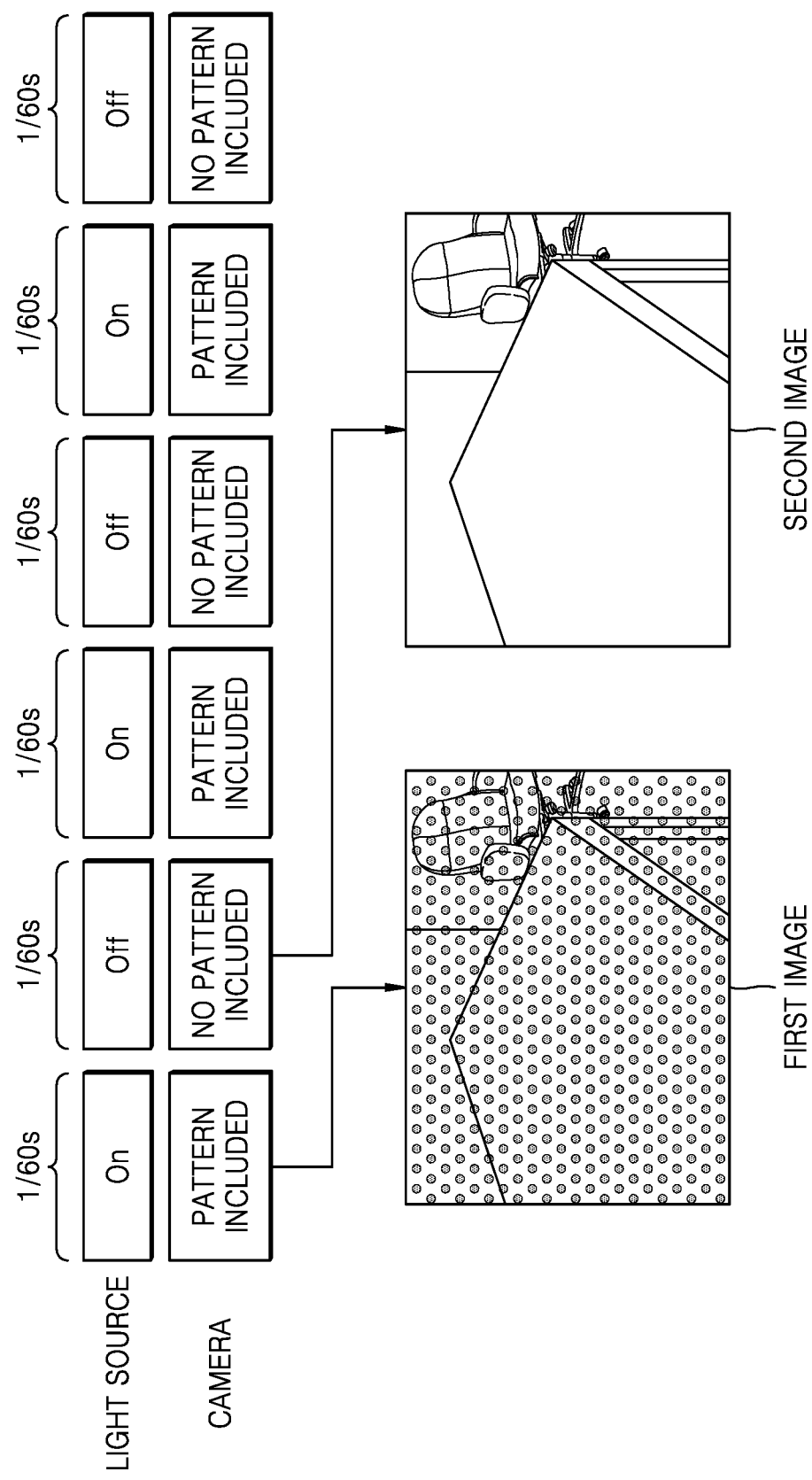
FIGS. 3 to 6 are diagrams illustrating examples of a method of obtaining a first image and a second image when a light source of an illuminator of an augmented reality device flickers according to the example embodiment of the disclosure.

According to an example embodiment, the first image and the second image may be obtained by equalizing the lengths of the turned-on period and the turned-off period of the light source of the illuminator 1300 and equalizing exposure times of the camera 1400. For example, the lengths of the turned-on period and the turned-off period of the light source of the illuminator 1300 may be same. Also, the exposure times of the camera 1400 during the turned-on period and the turned-off period of the light source may be the same. As shown in FIG. 3, the augmented reality device 1000 may set both the length of the turned-on period and the length of the turned-off period of the light source to 1/60s and may also set the exposure time of the camera 1400 to 1/60s. Accordingly, the augmented reality device 1000 may obtain a first image, which includes an optical pattern projected towards a subject from the light source, in the turned-on period of the light source, and obtain a second image, which does not include the optical pattern, in the turned-off period of the light source. The frame rate of the first image and the frame rate of the second image are the same. Although the example embodiment illustrated in FIG. 3 show that the turned-on period and the turned-off period are periodic, the disclosure is not limited thereto. As such, according to another example embodiment, the turned-on period and the turned-off period are aperiodic.

Figure 4:
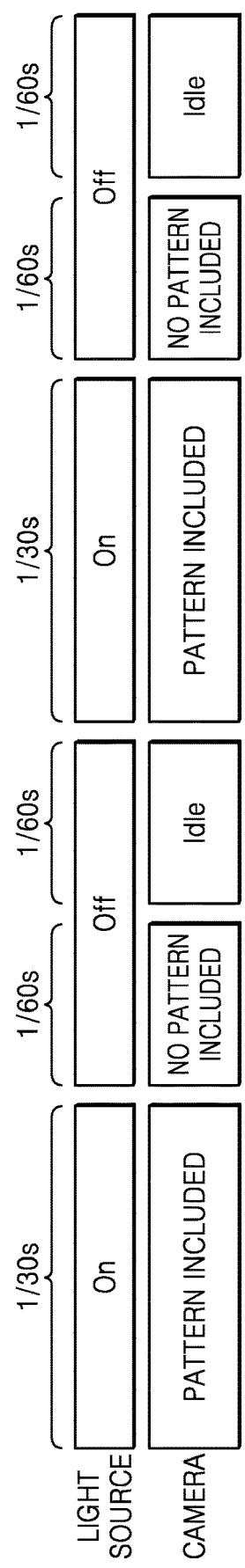

According to another example embodiment, the first image and the second image may be obtained by equalizing the lengths of the turned-on period and the turned-off period of the light source of the illuminator 1300 and setting the exposure time of the camera 1400 to be different from these lengths. For example, the lengths of the turned-on period and the turned-off period of the light source of the illuminator 1300 may be same. However, the exposure times of the camera 1400 during the turned-on period and the turned-off period of the light source may be different from each other. According to another example embodiment, the exposure times of the camera 1400 during the turned-on period and the turned-off period of the light source may be different from the turned-on period and the turned-off period of the light source. As shown in FIG. 4, the augmented reality device 1000 may set both the lengths of the turned-on period and the turned-off period of the light source to 1/30s. However, the exposure times of the camera 1400 in the turned-on period may be set to 1/30s and the exposure times of the camera 1400 in the turned-off period may be set to 1/60s. Accordingly, the augmented reality device 1000 may obtain a first image, which includes an optical pattern projected towards a subject from the light source, in the turned-on period of the light source, and obtain a second image, which does not include the optical pattern, in a section of the turned-off period of the light source. A remaining section of the turned-off period of the light source may be an idle mode in which no image is obtained. The frame rate of the first image and the frame rate of the second image are the same.

Figure 5:
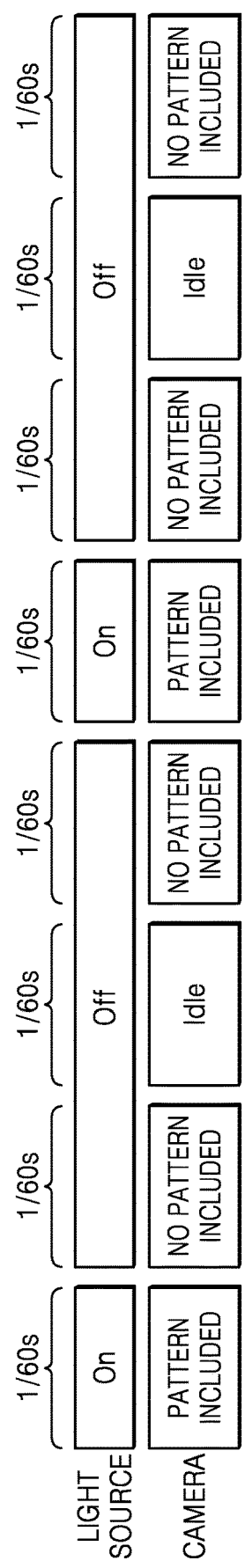

According to another example embodiment, the first image and the second image may be obtained by setting the lengths of the turned-on period and the turned-off period of the light source of the illuminator 1300 to be different and setting a frame rate of the first image and a frame rate of the second image to be different. As shown in FIG. 5, the augmented reality device 1000 may set the length of the turned-on period of the light source to 1/60s, set the length of the turned-off period of the light source to 1/20s, and set the frame rate of the second image to be two times the frame rate of the first image. For instance, the first image may be captured once during the turned-on period of the light source, and the second image may be captured twice during the turned-off period of the light source. Accordingly, the augmented reality device 1000 may obtain a first image, which includes an optical pattern projected towards a subject from the light source, in the turned-on period of the light source, and obtain a second image, which does not include the optical pattern, in a first section and a third section among three sections divided from the turned-off period of the light source. The second section among the three sections divided from the turned-off period of the light source may be an idle mode. Both an exposure time of the camera 1400 for one frame of the first image and an exposure time of the camera 1400 for one frame of the second image may be 1/60s.

Figure 6:
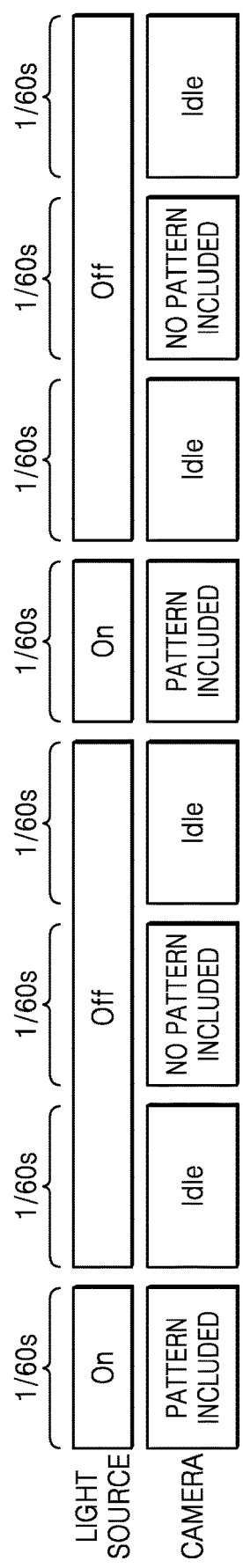

According to another example embodiment, the first image and the second image may be obtained by setting the lengths of the turned-on period and the turned-off period of the light source of the illuminator 1300 to be different and equalizing a frame rate of the first image and a frame rate of the second image. For instance, the first image may be captured once during the turned-on period of the light source, and the second image may be captured once during the turned-off period of the light source. In this case, in the turned-off period, an idle mode may be set before or after a shooting mode in which the camera 1400 obtains the second image. As shown in FIG. 6, the augmented reality device 1000 may set the length of the turned-on period of the light source to 1/60s, set the length of the turned-off period of the light source to 1/20(or 50 ms), and equalize the frame rate of the first image and the frame rate of the second image. Accordingly, the augmented reality device 1000 may obtain a first image, which includes an optical pattern projected towards a subject from the light source, in the turned-on period of the light source, and obtain a second image, which does not include the optical pattern, in a second section among three sections divided from the turned-off period of the light source. The first and third sections among the three sections divided from the turned-off period of the light source may be idle modes. Both an exposure time of the camera 1400 for one frame of the first image and an exposure time of the camera 1400 for one frame of the second image may be 1/60s.

Although FIGS. 3-6 illustrate example embodiments of the lengths of the turned-on period and the turned-off period of the light source of the illuminator 1300, the exposure times of the camera 1400 and the frame rates of the first and second images, the disclosure is not limited thereto. As such, according to another example embodiment, the lengths of the turned-on period and the turned-off period of the light source of the illuminator 1300, the exposure time of the camera 1400, the frame rate of the first image, the frame rate of the second image, etc. may be appropriately set in consideration of a reduction of power consumption, a condition for depth estimation, etc.

Figure 7:
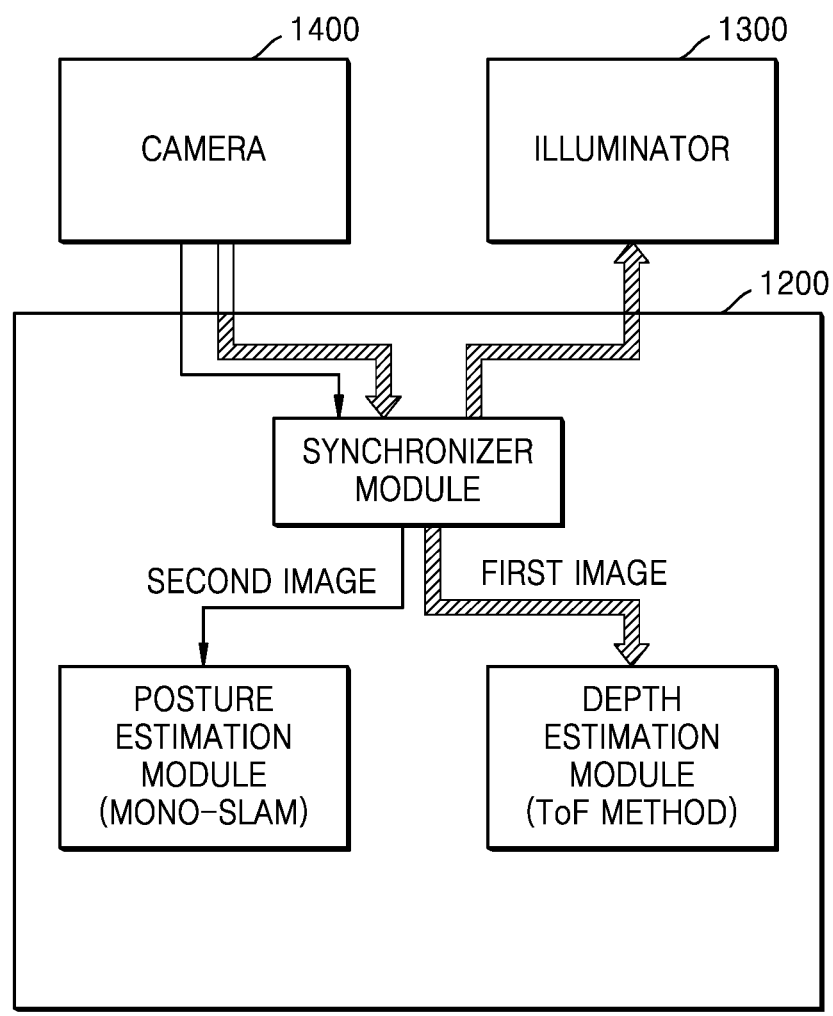
FIG. 7 is a diagram illustrating an example of estimating depth information by using a time-of-flight (ToF) method and estimating posture information by applying mono-simultaneous localization and mapping (SLAM) when a mono camera is included in an augmented reality device, according to an example embodiment of the disclosure.

FIG. 7 is a diagram illustrating an example of estimating depth information by the ToF method and estimating posture information by applying a mono-SLAM when a mono camera is included in an augmented reality device 1000 according to an example embodiment of the disclosure.

The processor 1200 may load and execute the synchronizer module, the depth estimation module, and the posture estimation module stored in the memory 1100 to estimate depth information and posture information, based on a first image and a second image obtained by controlling the illuminator 1300 and the camera 1400.

The processor 1200 may execute the synchronizer module to control the light source of the illuminator 1300 to be turned on or off, based on a clock signal. The light source of the illuminator 1300 may emit uniform high-frequency modulated infrared rays to a subject. The processor 1200 may execute the synchronizer module to obtain from the camera 1400 a first image in a turned-on period of the light source and a second image in a turned-off period of the light source, based on the clock signal. The processor 1200 may execute the synchronizer module to transmit the obtained first image to the depth estimation module and transmit the obtained second image to the posture estimation module.

The processor 1200 may execute the depth estimation module to estimate depth information with respect to the first image by the ToF method. The ToF method may be an indirect ToF method of emitting light having a continuous wavelength towards a subject and calculating a distance based on a phase difference between the emitted light and returning light or a direct ToF method of emitting light having a short wavelength towards a subject and calculating a distance based on a time difference between the emitted light and returning light.

The processor 1200 may execute the posture estimation module to apply the mono-SLAM to the second image so as to estimate posture information. The processor 1200 may estimate posture by detecting the position of the camera 1400 and at the same time creating a 3D map of the space by using a second image obtained by sensing surroundings by the camera 1400. The processor 1200 may estimate the posture of the augmented reality device 1000 by using a plurality of second images obtained by sensing surroundings by the camera 1400. That is, the processor 1200 may use a plurality of second images to detecting the position of the camera 1400 and at the same time creating a 3D map of the space.

The processor 1200 may perform image preprocessing on the first image and the second image, which are obtained from the camera 1400 based on whether the images are used for depth estimation or posture estimation. The processor 1200 may perform image preprocessing on the first image, which is to be used for depth estimation, to suppress a short wavelength band (e.g., a G or B channel), and perform image preprocessing on the second image, which is to be used for posture estimation, to suppress a long wavelength band (e.g., an R channel).

Figure 8:
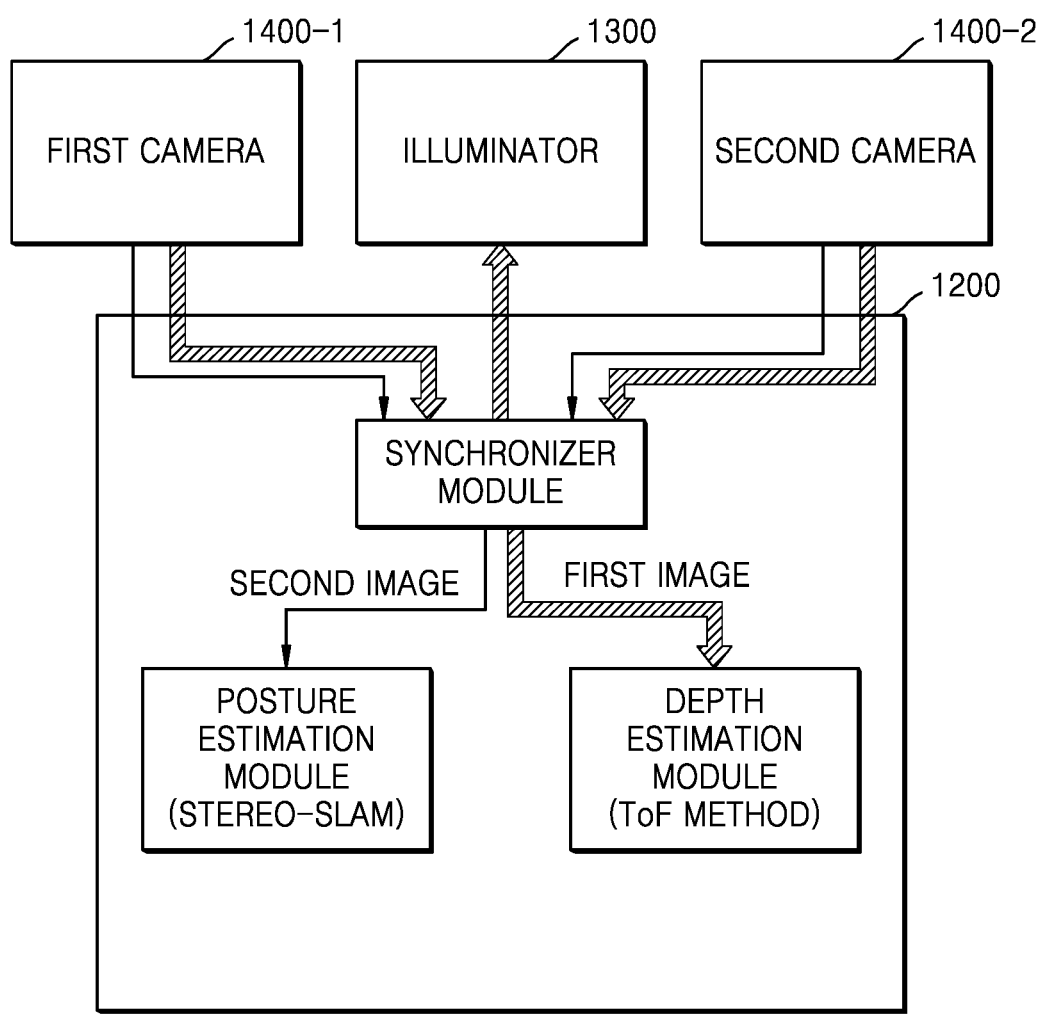
FIG. 8 is a diagram illustrating an example of estimating depth information by using the ToF method and estimating posture information by applying stereo-SLAM when a stereo camera is included in an augmented reality device, according to an example embodiment of the disclosure.

FIG. 8 is a diagram illustrating an example of estimating depth information by using the ToF method and estimating posture information by applying a stereo-SLAM when a stereo camera is included in an augmented reality device 1000 according to an example embodiment of the disclosure.

The processor 1200 may load and execute the synchronizer module, the depth estimation module, and the posture estimation module stored in the memory 1100 to estimate depth information and posture information, based on a first image and a second image obtained through control of the illuminator 1300, a first camera 1400-1, and a second camera 1400-2.

The processor 1200 may execute the synchronizer module to control the light source of the illuminator 1300 to be turned on or off, based on a clock signal. The light source of the illuminator 1300 may emit uniform high-frequency modulated infrared rays to a subject. The processor 1200 may execute the synchronizer module to obtain, from the first and second cameras 1400-1 and 1400-2, a plurality of first images in a turned-on period of the light source and a plurality of second images in a turned-off period of the light source, based on the clock signal. The processor 1200 may execute the synchronizer module to transmit the obtained first images to the depth estimation module and transmit the obtained second images to the posture estimation module.

The processor 1200 may execute the depth estimation module to estimate depth information by the ToF method with respect to at least one of the plurality of first images. The processor 1200 may execute the posture estimation module to apply the stereo-SLAM to the plurality of second images so as to estimate posture information. The processor 1200 may estimate posture by detecting a reference position of the first and second cameras 1400-1 and 1400-2 and at the same time creating a 3D map of the space by using the plurality of second images obtained by sensing surroundings by the first and second cameras 1400-1 and 1400-2.

Figure 9:
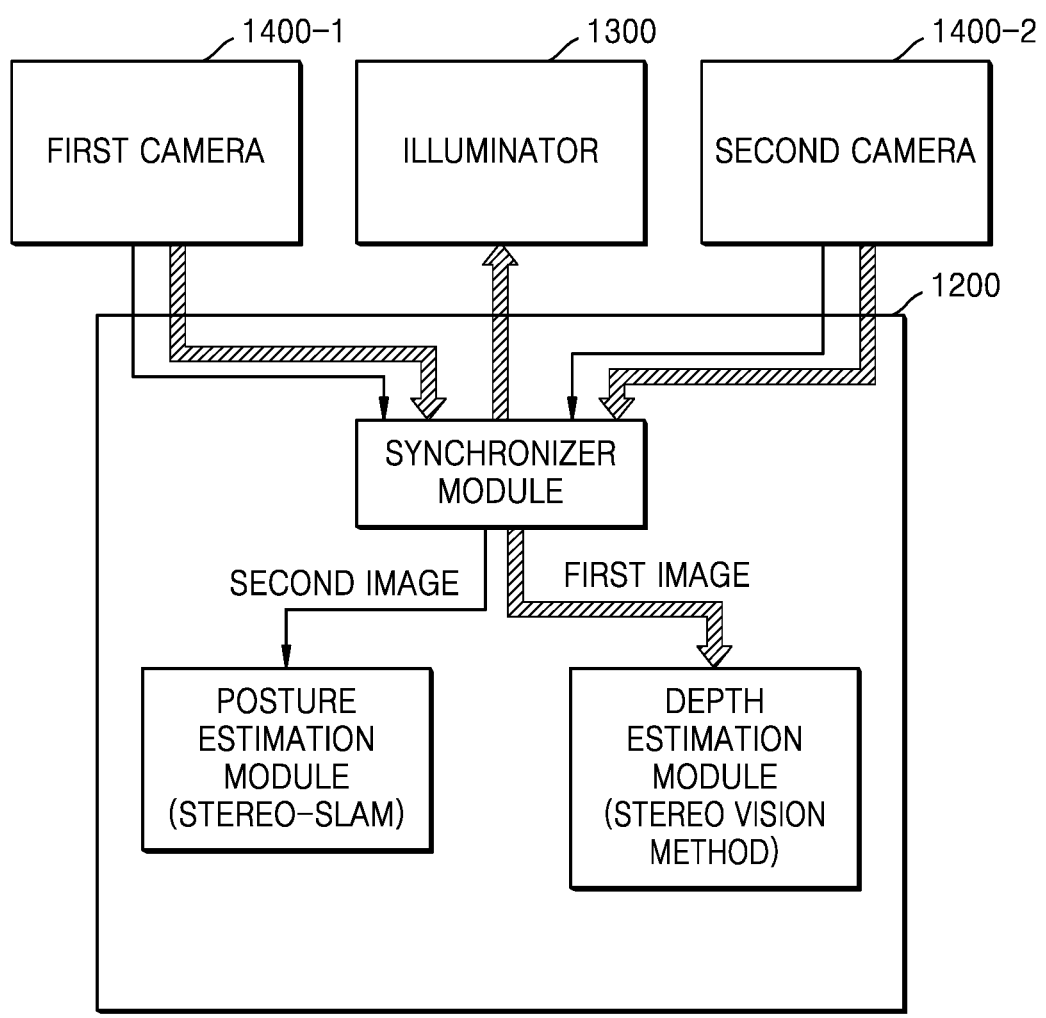
FIG. 9 is a diagram illustrating an example of estimating depth information by using a stereo vision method and estimating posture information by applying the stereo-SLAM when a stereo camera is included in an augmented reality device, according to an example embodiment of the disclosure.

FIG. 9 is a diagram illustrating an example of estimating depth information by using the stereo vision method and estimating posture information by applying the stereo-SLAM when a stereo camera is included in an augmented reality device 1000 according to an example embodiment of the disclosure.

The processor 1200 may load and execute the synchronizer module, the depth estimation module, and the posture estimation module stored in the memory 1100 to estimate depth information and posture information, based on a first image and a second image obtained through control of the illuminator 1300, a first camera 1400-1, and a second camera 1400-2.

The processor 1200 may execute the synchronizer module to control the light source of the illuminator 1300 to be turned on or off, based on a clock signal. The light source of the illuminator 1300 may project light having a certain pattern to a subject. The processor 1200 may execute the synchronizer module to obtain, from the first and second cameras 1400-1 and 1400-2, a plurality of first images in a turned-on period of the light source and a plurality of second images in a turned-off period of the light source, based on the clock signal. The processor 1200 may execute the synchronizer module to transmit the obtained first images to the depth estimation module and transmit the obtained second images to the posture estimation module.

The processor 1200 may execute the depth estimation module to estimate depth information with respect to the plurality of first images by the stereo-vision method. Because the light having the certain pattern is projected towards the subject from the light source of the illuminator 1300, a feature point of a first image including the pattern of the projected light may be augmented, thereby facilitating feature point matching for performing stereo vision. The processor 1200 may execute the posture estimation module to apply the stereo-SLAM to the plurality of second images so as to estimate posture information.

Figure 10:
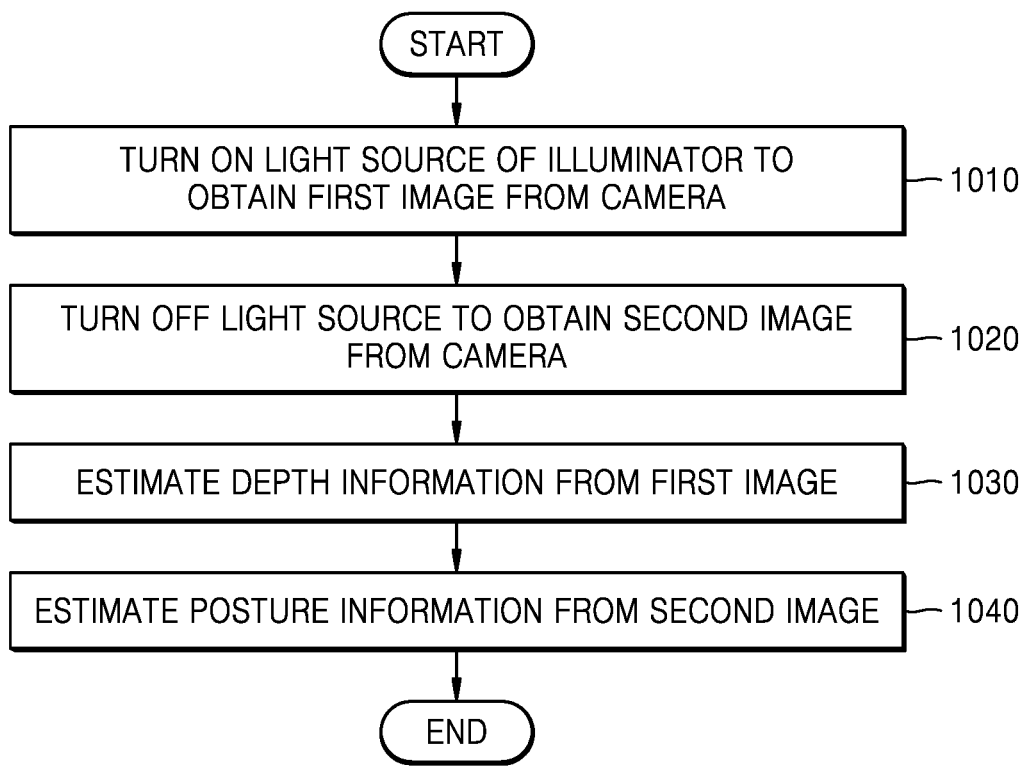
FIG. 10 is a flowchart of a control method of an augmented reality device, according to an example embodiment of the disclosure.

FIG. 10 is a flowchart of a control method of an augmented reality device 1000 according to an example embodiment of the disclosure.

The above description of the augmented reality device 1000 may apply to a control method of the augmented reality device 1000 to be described below.

In operation 1010, the augmented reality device 1000 may turn on the light source of the illuminator 1300 to obtain a first image from the camera 1400. The camera 1400 may operate as an active sensor as the light source of the illuminator 1300 is turned on. The light source of the illuminator 1300 may emit uniform high-frequency modulated infrared rays to a subject or project light having a certain pattern to the subject according to a method of estimating depth information.

In operation 1020, the augmented reality device 1000 may turn off the light source of the illuminator 1300 to obtain a second image from the camera 1400. The camera 1400 may operate as a passive sensor as the light source of the illuminator 1300 is turned off.

In the augmented reality device 1000, the camera 1400 may be used as an active sensor or a passive sensor as the light source of the illuminator 1300 flickers. For instance, the camera 1400 may be used as an active sensor during a period when the light source of the illuminator 1300 is ON state and the camera 1400 may be used as a passive sensor during a period when the light source of the illuminator 1300 is OFF state as the light source of the illuminator 1300 flickers. The first image and the second image may be alternately obtained as the light source of the illuminator 1300 flickers. The obtaining of the first image in a turned-on period of the light source of the illuminator 1300 and the obtaining of the second image in a turned-off period of the light source of the illuminator 1300 may be performed in the time-division manner to be alternately arranged in a temporal sense.

In operation 1030, the augmented reality device 1000 may estimate depth information, based on the first image. The augmented reality device 1000 may estimate depth information with respect to at least one first image by the ToF method or the stereo vision method. For example, when the camera 1400 is a mono camera, the augmented reality device 1000 may estimate depth information with respect to the first image by the ToF method. As another example, when the camera 1400 is a stereo camera, the augmented reality device 1000 may estimate depth information with respect to at least one of a plurality of first images by the ToF method or estimate depth information with respect to the plurality of first images by the stereo vision method.

In operation 1040, the augmented reality device 1000 may estimate posture information, based on the second image. The augmented reality device 1000 may estimate posture information by applying the mono-SLAM or the stereo-SLAM to at least one second image. For example, when the camera 1400 is a mono camera, the augmented reality device 1000 may estimate posture information by applying the mono-SLAM to the second image. As another example, when the camera 1400 is a stereo camera, the augmented reality device 1000 may estimate posture information by applying the stereo-SLAM to a plurality of second images.

Figure 11:
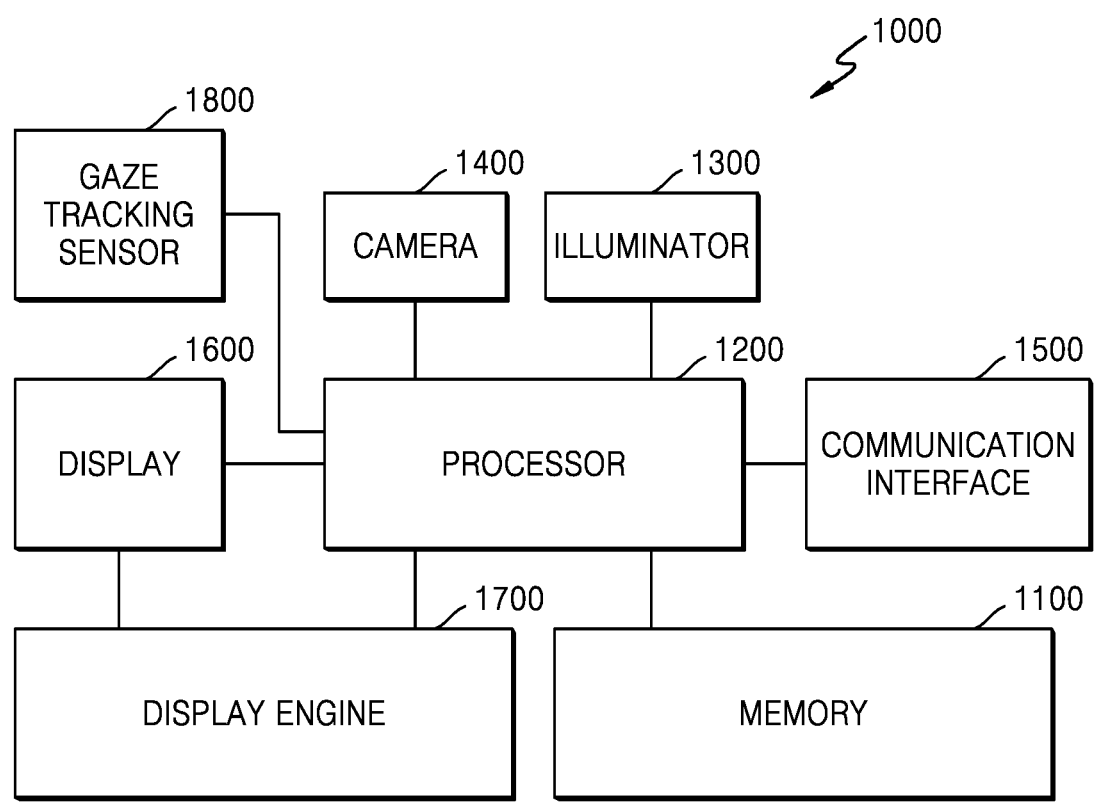
FIG. 11 is a diagram for describing an example of an augmented reality device according to an example embodiment of the disclosure.

FIG. 11 is a diagram for describing an example of an augmented reality device 1000 according to an example embodiment of the disclosure.

Referring to FIG. 11, the augmented reality device 1000 may include a communication interface 1500, a display 1600, a display engine 1700, and a gaze tracking sensor 1800, as well as the memory 1100, the processor 1200, the illuminator 1300, and the camera 1400 described above in FIG. 2. The augmented reality device 1000 may further include other elements, such as a position sensor to sense a position of the augmented reality device 1000 or a power supply to supply power to the augmented reality device 1000, but a description of these elements is omitted here.

The communication interface 1500 may establish wired/wireless communication with other devices or a network. To this end, the communication interface 1500 may include electronic components and/or circuitry for supporting at least one of various wired/wireless communication methods. For example, the communication interface 1500 may include electronic components and/or circuitry for establishing short range communication such as wireless fidelity (Wi-Fi) and Bluetooth, various types of mobile communication, or ultra-wideband communication. The communication interface 1500 may be connected to a device outside the augmented reality device 1000 to transmit an image obtained or generated by the augmented reality device 1000 to an external device.

According to an example embodiment, the augmented reality device 1000 may provide a virtual image through the display 1600 and the display engine 1700. For example, the augmented reality device 1000 may provide a popup window of a virtual image through the display 1600 and the display engine 1700. A virtual image refers to an image created by an optical engine and may include both a static image and a dynamic image. The virtual image may be an image that is observed together with a real world scene viewed by a user through the augmented reality device 1000 and that represents information about a real world object included in the real world scene, information about an operation of the augmented reality device 1000, a control menu or the like.

The display engine 1700 may include an optical engine to generate and project a virtual image, and a guide element or component to guide light of the virtual image projected from the optical engine to the display 1600. The optical engine may include electronic components and/or circuitry to generate and output the virtual image. The display 1600 may include a see-through waveguide included in the left lens part and/or the right lens part of the augmented reality device 1000. The display 1600 may display a virtual image representing information about an object, information about an operation of the augmented reality device 1000 or the control menu.

When a pop-up window of a virtual image is displayed on the display 1600, a user wearing the augmented reality device 1000 may expose his or her hand to the camera 1400 and select a function of the augmented reality device 1000 in the pop-up window of the virtual image with the exposed hand to perform this function.

The gaze tracking sensor 1800 may detect gaze information such as a gaze direction in which a user' eye is directed, a pupil position of the user's eye, or coordinates of a center point on the pupil of the user's eye, etc. The processor 1200 may identify a form of an eye movement, based on the gaze information of the user detected by the gaze tracking sensor 1800. For example, the processor 1200 may determine various types of a gaze movement, including fixation of staring at one place, pursuit of tracking a moving object, saccade of quickly moving eyes from one point to another point, etc., based on the gaze information obtained by the gaze tracking sensor 1800.

The processor 1200 of the augmented reality device 1000 may determine a gaze point of the user or a gaze movement of the user by using the gaze tracking sensor 1800, and use the determined gaze point or gaze movement to control the augmented reality device 1000. The processor 1200 may obtain at least one image by controlling a direction of the illuminator 1300 or the camera 1400 according to the gaze point or the gaze movement determined by the gaze tracking sensor 1800. For example, a user may wear the augmented reality device 1000 to obtain an image in a first direction and control a direction of photographing by the camera 1400 according to the gaze point or the gaze movement of the user to obtain another image in a second direction.

Figure 12:
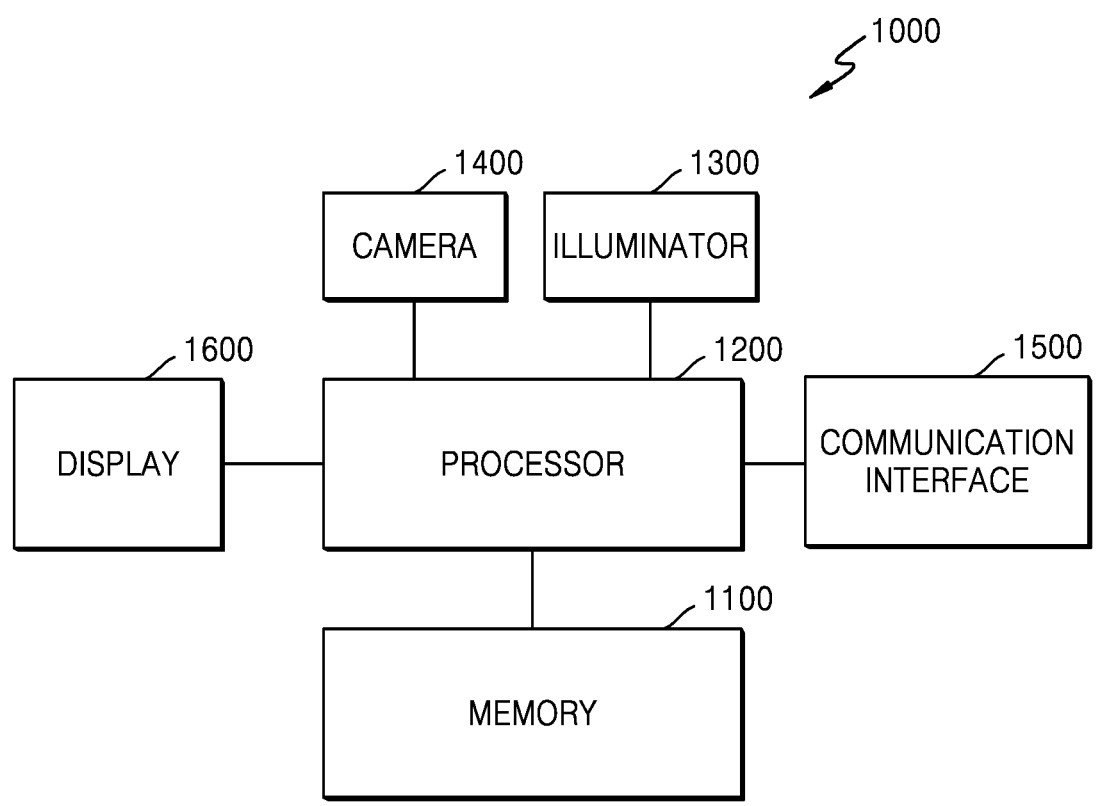
FIG. 12 is a diagram for describing another example of an augmented reality device according to an example embodiment of the disclosure.

FIG. 12 is a diagram for describing another example of an augmented reality device 1000 according to an example embodiment of the disclosure.

FIG. 12 illustrates a case in which the augmented reality device 1000 is a smartphone or a digital camera with an augmented reality function. The augmented reality device 1000 may include a memory 1100, a processor 1200, an illuminator 1300, a camera 1400, a communication interface 1500, and a display 1600. The augmented reality device 1000 may further include components such as a position sensor that senses a position of the augmented reality device 1000 and a power supply that supplies power to the augmented reality device 1000, and a redundant description will be omitted here and differences from the previous embodiments will be described below.

The communication interface module 1500 may be connected to a device outside the augmented reality device 1000 such as a smartphone or a digital camera, to transmit an image obtained or generated by the augmented reality device 1000 to the device.

The display 1600 may include an output interface to provide information or an image and may further include an input interface to receive an input. The output interface may include a display panel and a controller for controlling the display panel, and may be embodied as various types of display such as an organic light-emitting diode (OLED) display, an active-matrix organic light-emitting diode (AM-OLED) display, and a liquid crystal display (LCD). The input interface may receive various types of inputs from a user and include at least one of a touch panel, a keypad or a pen recognition panel. The display 1600 may be in the form of a touch screen that is a combination of a display panel and a touch panel, and be provided to be flexible or foldable.

Figure 13:
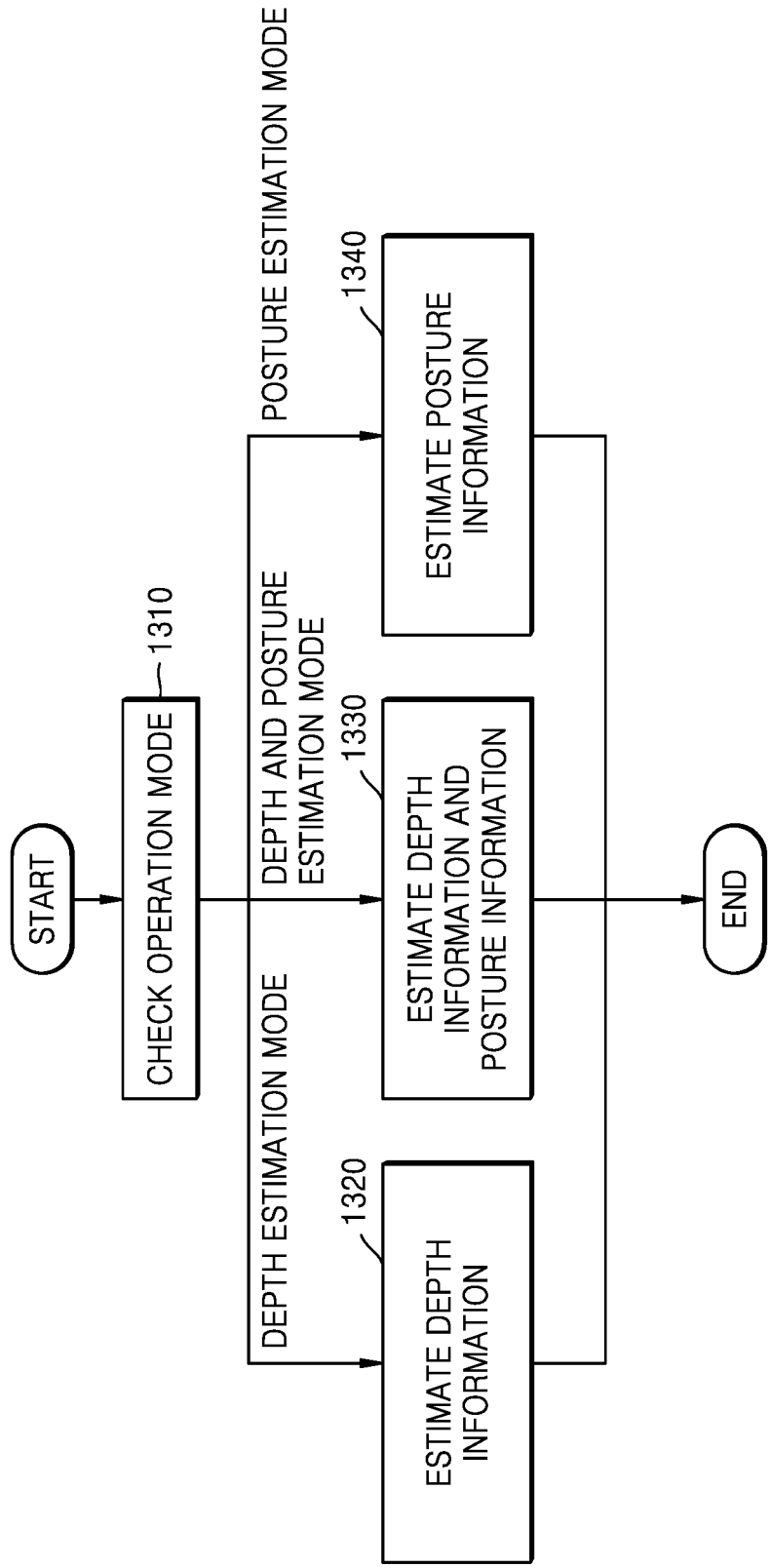
FIG. 13 is a flowchart of another example of a control method of an augmented reality device, according to an example embodiment of the disclosure.

FIG. 13 is a flowchart of another example of a control method of an augmented reality device 1000 according to an example embodiment of the disclosure.

In operation 1310, the augmented reality device 1000 may check an operation mode. The operation mode may be determined according to an input from a user of the augmented reality device 1000 or a state or usage environment of the augmented reality device 1000. For example, an operation mode of the augmented reality device 1000 may be determined when the augmented reality device 1000 is controlled by a user's voice or through a button or the input interface of the touch screen of the augmented reality device 1000 to operate in the operation mode. As another example, an operation mode of the augmented reality device 1000 may be determined to perform an operation mode or prevent performance of the operation mode according to a remaining battery capacity of the augmented reality device 1000. As another example, a certain operation mode may be selectively determined from among a plurality of operation modes, depending on whether an environment of a space in which the augmented reality device 1000 is located or whether a movement of the augmented reality device 1000 is continuously changed.

In operation 1320, when the determined operation mode is identified as a depth estimation mode, the augmented reality device 1000 may turn on the light source of the illuminator 1300 to obtain a first image from the camera 1400. The augmented reality device 1000 may estimate depth information by the ToF method or the stereo vision method, based on the first image.

In operation 1330, when the determined operation mode is identified as a depth and posture estimation mode, the augmented reality device 1000 may turn on the light source of the illuminator 1300 to obtain the first image from the camera 1400. The camera 1400 may operate as an active sensor as the light source of the illuminator 1300 is turned on. The augmented reality device 1000 may turn off the light source of the illuminator 1300 to obtain a second image from the camera 1400. The camera 1400 may operate as a passive sensor as the light source of the illuminator 1300 is turned off. The obtaining of the first image in a turned-on period of the light source of the illuminator 1300 and the obtaining of the second image in a turned-off period of the light source of the illuminator 1300 may be performed in the time-division manner to be alternately arranged in a temporal sense. The augmented reality device 1000 may estimate depth information by the ToF method or the stereo vision method, based on the first image. The augmented reality device 1000 may estimate posture information by applying the mono-SLAM or the stereo-SLAM, based on the second image.

In operation 1340, when the determined operation mode is identified as a posture estimation mode, the augmented reality device 1000 may turn on the light source of the illuminator 1300 to obtain the second image from the camera 1400. The augmented reality device 1000 may estimate posture information by applying the mono-SLAM or the stereo-SLAM, based on the second image.

The operation mode of the augmented reality device 1000 is not limited to the example of FIG. 13. Part of the operation mode of FIG. 13 may be excluded or another operation mode may be added to control the augmented reality device 1000 according to various type of operation modes.

The augmented reality device 1000 described herein may be implemented with hardware components, software components, and/or a combination thereof. For example, the augmented reality device 1000 described in the example embodiments of the disclosure set forth herein may be implemented by one or more general-purpose computers or special-purpose computers, e.g., a processor, an arithmetic logic unit (ALU), application specific integrated circuits (ASICs), digital signal processors (DSPs), digital signal processing devices (DSPDs), programmable logic devices (PLDs), a microcomputer, a microprocessor, or any other devices capable of executing or responding to instructions.

The software components may include a computer program, code, instructions, or a combination of one or more of them, and cause a processing device to operate as desired or send instructions independently or collectively to the processing device.

The software components may be embodied as a computer program including instructions stored in a computer-readable storage medium. The computer-readable recording medium may include, for example, a magnetic storage medium (e.g., read-only memory (ROM), random-access memory (RAM), a floppy disk, a hard disk, etc.) and an optical reading medium (e.g., a CD-ROM, a Digital Versatile Disc (DVD)), and the like. The computer-readable recording medium may be distributed over network coupled computer systems so that computer readable code may be stored and executed in a distributed fashion. The computer-readable recording medium is readable by a computer, stored in memory, and executed by a processor.

The computer refers to a device capable of calling an instruction stored in a storage medium and operating according to the example embodiments of the disclosure set forth herein, based on the called instruction, and may include the augmented reality device 1000 according to the example embodiments of the disclosure set forth herein.

The computer-readable storage medium may be provided as a non-transitory storage medium. Here, the term "non-temporary" means that the storage medium does not include a signal and is tangible but does not indicate whether data is stored in the storage medium semi-permanently or temporarily.

A control method of the augmented reality device 1000 according to the example embodiments of the disclosure set forth herein may be provided by being included in a computer program product. The computer program product may be traded as a product between a seller and a purchaser.

The computer program product may include a software program and a computer-readable storage medium storing the software program. For example, the computer program product may include a product (e.g., a downloadable application) in the form of a software program electronically distributed through a manufacturer of the augmented reality device 1000 or an electronic market (e.g., Google Play Store or App Store). For electronic distribution of the computer program product, at least part of the software program may be stored in a storage medium or temporarily generated. In this case, the storage medium may be a storage medium of a server of the manufacturer, a server of the electronic market, or a storage medium of a relay server that temporarily stores the software program.

The computer program product may include a storage medium of a server or a storage medium of a user terminal in a system consisting of the server and the user terminal (e.g., an augmented reality device). Alternatively, when there is a third device (e.g., a smart phone) capable of establishing communication with the server or the user terminal, the computer program product may include a storage medium of the third device. Alternatively, the computer program product may include a software program transmitted from the server to the user terminal or the third device or transmitted from the third device to the user terminal.

In this case, the server, the user terminal, or the third device may execute the computer program product to perform the methods according to the embodiments set forth herein. Alternatively, two or more among the server, the user terminal, and the third device may execute the computer program product to perform the methods according to the embodiments set forth herein in a distributed method.

For example, the server (e.g., a cloud server or an artificial intelligence server) may execute the computer program product stored in the server to control the user terminal connected thereto through communication to perform the methods according to the embodiments set forth herein.

As another example, the third device may execute the computer program product to control the user terminal connected thereto to perform the methods according to the embodiments set forth herein.

When the third device executes the computer program product, the third device may download the computer program product from the server and execute the downloaded computer program product. Alternatively, the third device may execute the computer program product provided in a preloaded state to perform the methods according to the embodiments of the disclosure set forth herein.

Although embodiments of the disclosure have been described above in conjunction with the limited number of embodiments of the disclosure and the drawings, various modifications and modifications can be made from the above description by those of ordinary skill in the art. For example, an appropriate result may be achieved even when the above-described techniques are performed in an order different from that described herein, and the above-described components such as an electronic device, a structure, and a circuit, are combined in a form different from that described herein or replaced with other components.

The invention claimed is:

1. An augmented reality device comprising:
a light source;
a camera;
a memory storing one or more instructions; and
a processor configured to execute the one or more instructions to:
turn on the light source and obtain a first image from the camera, turn off the light source and obtain a second image from the camera, estimate depth information based on the first image, and estimate posture information based on the second image.

2. The augmented reality device of claim 1, wherein the processor is further configured to execute the one or more instructions to selectively operate the camera as an active sensor or a passive sensor as the light source flickers.

3. The augmented reality device of claim 1, wherein the processor is further configured to execute the one or more instructions to alternately obtain the first image and the second image as the light source flickers.

4. The augmented reality device of claim 1, wherein the processor is further configured to execute the one or more instructions to process, in a time-division manner, a first process of obtaining the first image in a turned-on period of the light source and a second process of obtaining the second image in a turned-off period of the light source.

5. The augmented reality device of claim 4, wherein the processor is further configured to execute the one or more instructions to obtain the first image and the second image by:

setting a first length of the turned-on period to be equal to a second length of the turned-off period, and setting a first exposure time of the camera in the turned-on period to be equal to a second exposure time of the camera in the turned-off period.

6. The augmented reality device of claim 4, wherein the processor is further configured to execute the one or more instructions to obtain the first image and the second image by:

setting a first length of the turned-on period to be equal to a second length of the turned-off period, and setting a first exposure time of the camera in the turned-on period to be different from a second exposure time of the camera in the turned-off period.

7. The augmented reality device of claim 4, wherein the processor is further configured to execute the one or more instructions to obtain the first image and the second image by:

setting a first length of the turned-on period to be different from a second length of the turned-off period, and setting a first frame rate of the first image to be different from a second frame rate of the second image.

8. The augmented reality device of claim 4, wherein the processor is further configured to execute the one or more instructions to obtain the first image and the second image by:

setting a first length of the turned-on period to be different from a second length of the turned-off period, and setting a first frame rate of the first image to be equal to a second frame rate of the second image.

9. The augmented reality device of claim 8, wherein the processor is further configured to execute the one or more instructions to:

set an idle mode before and after a shooting mode in the turned-off period, and obtain the second image in the shooting mode.

10. The augmented reality device of claim 1, wherein the camera is a mono camera, and the processor is further configured to execute the one or more instructions to:

estimate the depth information with respect to the first image by using a time-of-flight (ToF) method, and estimate the posture information by applying mono-simultaneous localization and mapping (SLAM) to the second image.

11. The augmented reality device of claim 1, wherein the camera comprises a first stereo camera and a second stereo camera, and the processor is further configured to execute the one or more instructions to:

estimate the depth information with respect to at least one of a plurality of first images by using a time-of-flight (ToF) method, and estimate the posture information by applying stereo-simultaneous localization and mapping (SLAM) to a plurality of second images, wherein the plurality of first images and the plurality of second images are captured by the camera.

12. The augmented reality device of claim 1, wherein the light source is configured to project light with a certain pattern towards a subject, and the camera comprises a first stereo camera and a second stereo camera, and the processor is further configured to execute the one or more instructions to:

estimate the depth information with respect to a plurality of first images by using a stereo vision method, and estimate the posture information by applying stereo-simultaneous localization and mapping (SLAM) to a plurality of second images, wherein the plurality of first images and the plurality of second images are captured by the camera.

13. The augmented reality device of claim 1, wherein the first image comprises an optical pattern projected towards a subject from the light source and the second image comprises no optical pattern.

14. A control method of an augmented reality device, the control method comprising:

obtaining a first image from a camera by turning on a light source;

obtaining a second image from the camera by turning off the light source;

estimating depth information based on the first image; and estimating posture information based on the second image.

15. A non-transitory computer-readable recording medium storing a program executable by a computer, the non-transitory computer-readable recording medium comprising:

instructions to obtain a first image from a camera by turning on a light source;

instructions to obtain a second image from the camera by turning off the light source;

instructions to estimate depth information, based on the first image; and instructions to estimate posture information, based on the second image.

16. The augmented reality device of claim 1, wherein the first image is captured during a first time period when the light source is turned on, and wherein the second image is captured during a second time period when the light source is turned off.

17. The augmented reality device of claim 1, wherein the first image is captured by the camera during a first time period when an optical pattern is projected in a field of view of the camera, and wherein the second image is captured during a second time period when the optical pattern is not projected in the field of view of the camera.

18. The augmented reality device of claim 1, wherein the first image comprises an a target object and an optical pattern overlapping the target object, and
wherein the second image comprises the target object and does not include the optical pattern overlapping the target object.

\* \* \* \* \*